United States Patent
Kwan (10) Patent No.: US 9,229,957 B2
(45) Date of Patent: Jan. 5, 2016

(54) REFERENCE OBJECTS AND/OR FACIAL/BODY RECOGNITION

(75) Inventor: John Kwan, Santa Clara, CA (US)

(73) Assignee: KWAN SOFWARE ENGINEERING, INC., Santa Clara, CA (US)

( * ) Notice: Subject to any disclaimer, the term of this patent is extended or adjusted under 35 U.S.C. 154(b) by 901 days.

(21) Appl. No.: 13/192,331

(22) Filed: Jul. 27, 2011

(65) Prior Publication Data

US 2012/0027268 A1 Feb. 2, 2012

Related U.S. Application Data

(63) Continuation-in-part of application No. 12/779,920, filed on May 13, 2010.

(60) Provisional application No. 61/512,260, filed on Jul. 27, 2011, provisional application No. 61/177,983, filed on May 13, 2009.

(51) Int. Cl.
*G06F 17/30* (2006.01)
*G06K 9/62* (2006.01)

(52) U.S. Cl.
CPC ........ *G06F 17/30256* (2013.01); *G06K 9/6255* (2013.01)

(58) Field of Classification Search
CPC ... G06K 9/6255; G06K 9/00; G06F 17/30256
USPC .......................................... 382/115, 118, 124
See application file for complete search history.

(56) References Cited

U.S. PATENT DOCUMENTS

| | | | |
|---|---|---|---|
| 6,249,616 B1 * | 6/2001 | Hashimoto | 382/284 |
| 6,895,103 B2 * | 5/2005 | Chen et al. | 382/117 |
| 2008/0317357 A1 * | 12/2008 | Steinberg et al. | 382/209 |
| 2011/0255741 A1 * | 10/2011 | Jung et al. | 382/103 |

* cited by examiner

*Primary Examiner* — Edward Park
(74) *Attorney, Agent, or Firm* — GSS Law Group (57) ABSTRACT

Five embodiments are disclosed. The first may generate and/or manage reference objects in images. The second may use the reference objects to create 3-D simulations of landscapes, urban settings, architectural models, land management presentations, disaster analysis and/or interactive games. The third may use the reference objects and/or previously presented object schematics to construct provably impartial mug shot folders for law enforcement, alter security processes to support communication of object schematics with a database used to identify people, and/or modify that database to use object schematics. The fourth may access an image with a focal length spread to generate one or more derived images to find the reference images and the items of interest for human facial/body recognition based upon realistic parameters of the reference objects to create/alter the object schematics. The fifth may implement combinations of two or more of the previous four embodiments.

14 Claims, 11 Drawing Sheets

Facial feature list 340
- Left eye 342
- Left eye brow 343
- Left ear 344
- Left jaw 346
- Right eye 348
- Right eye brow 349
- Right ear 350
- Right jaw 352
- Chin 354
- Nose 356
- Mouth 358
- Face 26
- Tattoo 345
- Scar 347

Fig. 9B

Body feature list 360
- Left hand 361
- Left forearm 362
- Left arm 363
- Left shoulder 364
- Left breast 365
- Left hip 366
- Left shin 367
- Left ankle 368
- Left foot 369
- Right hand 371
- Right forearm 372
- Right arm 373
- Right shoulder 374
- Right breast 375
- Right hip 376
- Right shin 377
- Right ankle 378
- Right foot 379
- Tattoo 345
- Scar 347
- Face 26
- Body 28
- Head 359

Fig. 9C

Parameter List 380
- Left most position 330
- Top most position 332
- Right most position 334
- Bottom most position 336
- Width 382
- Height 384
- Midpoint position 386
- Front most position 387
- Rear most position 338
- Depth 388

REFERENCE OBJECTS AND/OR FACIAL/BODY RECOGNITION

CROSS REFERENCE TO RELATED PATENT APPLICATIONS

This application claims priority to

Provisional Patent Application No. 61/512,260 entitled "Reference Objects and/or Facial/Body Recognition" filed Jul. 27, 2011 for John Kwan, and is a Continuation-In-Part to U.S. patent application Ser. No. 12/779,920, entitled "Facial and/or Body Recognition with Improved Accuracy" filed May 13, 2010 for John Kwan, which claims priority to Provisional Patent Application No. 61/177,983, entitled "Method and Apparatus for Improved Accuracy in Facial Recognition and/or Body Recognition" filed May 13, 2009 for John Kwan, all of which are incorporated herein by reference in their entirety.

TECHNICAL FIELD

This disclosure relates to five sets of embodiments. The first embodiments generate and/or manage reference objects in images. Each reference object includes a reference item and at least one real world measurement of the reference item. The reference items may be embedded in one or more images. The real world measurements may be embedded in the image and/or in a separate memory. Images, or motion image sequences, may be searched for reference items.

The second embodiments use reference objects to support 3-D simulations of landscapes, urban settings, architectural models, land management presentations, disaster analysis and/or interactive games.

The third embodiments may use the reference objects and/or the previously presented object schematics of automated facial/body recognition. The object schematics associate real world measurements with features of a human face and/or body. These object schematics may account for the distance between the eyes, height of one or both ears and so on. The automated facial/body recognition may be used to construct mug shot folders for law enforcement. Pre-existing databases may be used to identify people and supports the communication of the object schematics into and out of these databases. Pre-existing databases may be upgraded to use and/or include the reference objects and/or the object schematics.

Recently, digital light field photography and cameras supporting such photographic recording processes have been announced. These cameras can generate images with a focal length spread. The fourth embodiments accesses such images to generate derived images of the reference items and items of interest such as a human face and/or a human body that may then be used to generate part or all of an object schematic.

The fifth embodiments may be configured to support various combinations of two or more of the preceding embodiments.

BACKGROUND OF THE INVENTION

This section will summarize the background from the parent patent application and then discuss new needs and problems that are addressed by some of the embodiments of this disclosure.

As previously presented in the parent application, facial recognition technology is a technology by which a machine, such as a computer, takes one or more digital photographs, scanned photographs, video or movies of a person's face and/or body. The machine finds one or more candidate people from a collection of photos of known people and finds the most probable identity of the person.

One problem arises, as to the fairness of the assembly of mug shot folders for review by an eyewitness of a crime. It may be argued that a folder has only one mug shot similar to the accused. The victim or witness may be selecting the only similar mug shot to whomever they saw.

Another problem involves transforming raw photo sequences from disasters into 3-D models to help figure out what happened and to aid in locating survivors. While the spread of digital cameras in cellular phones has occurred around the world, this life saving capability is unavailable.

Another problem is generating a 3-D model of a landscape or urban setting to support various land management related processes, simulations and/or interactive games.

SUMMARY OF THE INVENTION

Five potentially separate embodiments are disclosed in this document: The first embodiments may be configured to generate and/or manage reference objects in images. Each reference object includes a reference item and at least one real world measurement, which will be called a reference parameter, of the reference item. The reference items may be embedded in one or more images. The reference parameters may be embedded in the image and/or in a separate memory.

The second embodiments may use the reference objects to create 3-D simulations of landscapes, urban settings, architectural models, land management presentations, disaster analysis and/or interactive games.

The third embodiments may use the reference objects and/or object schematics of automated facial/body recognition. The object schematics associate real world parameters with features of a human face and/or body. These object schematics may account for the distance between the eyes, height of one or both ears and so on. Alternatively, the automated facial/body recognition may be used to construct mug shot folders for law enforcement. Another alternative uses pre-existing databases to identify people, and supports the communication of the object schematics into and out of these databases. Another alternative upgrades a pre-existing database of images and personal information to include the object schematics.

Figure 2A:
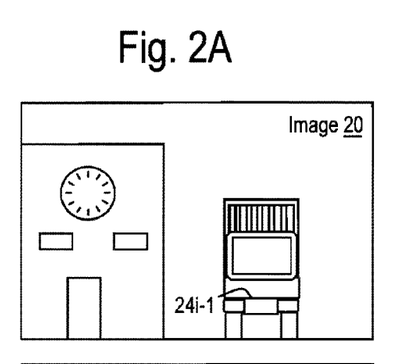
FIGS. 2A to 2C show some examples of the first processor generating a new reference object in an image from a first reference object image.
Figure 2B:
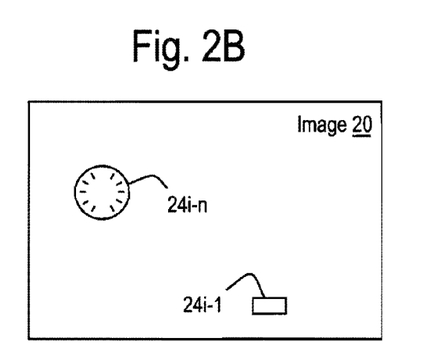
Figures 2C, 3:
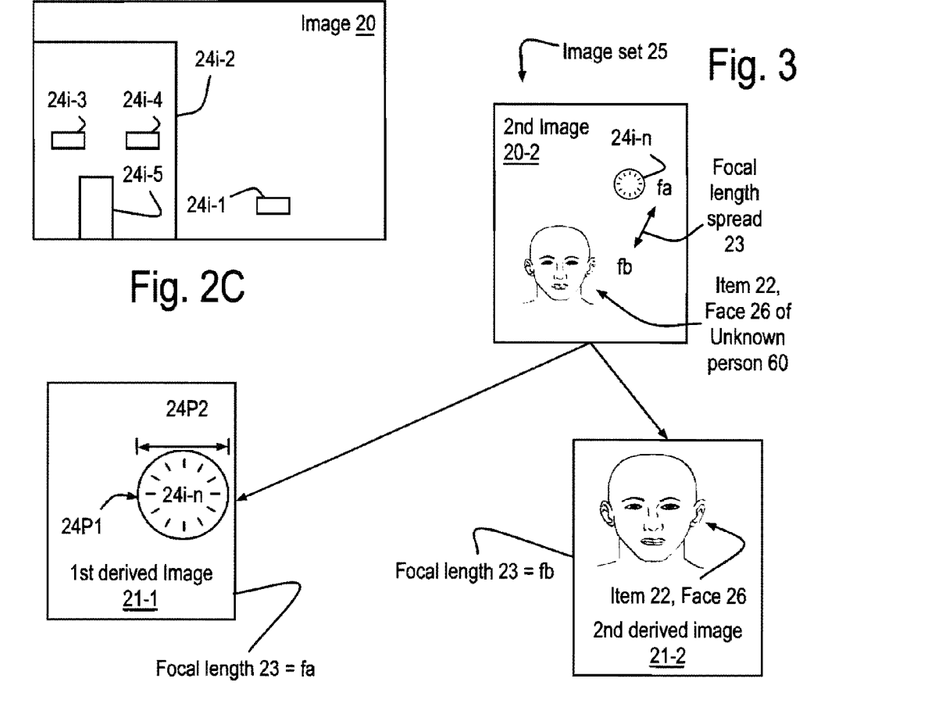
FIG. 3 shows an example of identifying the new reference object image and an item, which may a face of an unknown person in a second image implementing a spread in focal length. Together, an image set including the image and one or more derived images of fixed focal form authenticated artifacts that may be used in law enforcement and other public safety settings to identify previously unknown persons who may be at risk, lost and/or involved with a crime.
Figure 4:
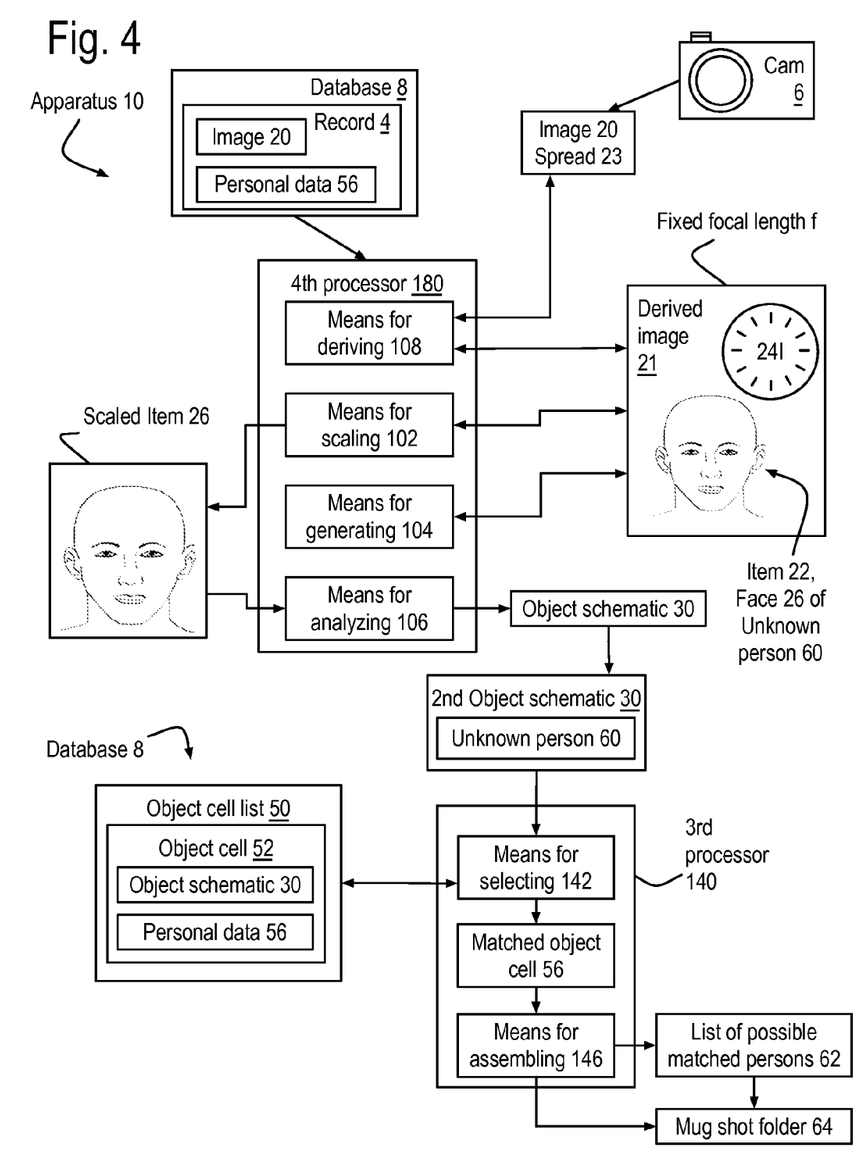
FIG. 4 shows an example of a camera generating the image with a spread in focal length accessed by a fourth processor to generate at least one derived image. The fourth processor may also access a database of records that may also include a version of an image as well as personal data. The result of such a process includes not only the determination of reference objects and possibly identifying an item, but also in the generation of the derived images using known authentic image processing steps, in this situation, setting the focal length. The fourth processor may further generate a scaled item that is analyzed to create and/or alter the object schematic. The object schematic may be the second object schematic of an unknown person. The third processor may use the object schematic to select a list of possible matched persons used to generate the mug shot folder.

The fourth embodiments support engaging with images implementing a spread of focal length to generate at least two derived images based upon differing focal lengths to generate the reference image and the item of interest as shown in FIGS. 3 and 4.

The fifth embodiments may include apparatus configured to support combinations of two or more of the embodiments, which will be referred to as implementation vehicles. Examples of implementation vehicles may include computers, reconfigurable logic devices, communications devices, and cameras.

One or more installation packages may configure the implementation vehicle to implement a combination of the above processes.

In some situations, all of these processes may be implemented in one communication device and/or a computer. The communication device may include a cellular phone, an Internet access device which may or may not comply with international wireless network communications standards and/or a camera.

The disclosed embodiments may be configured to perform some combination of the following:

Generate the reference object for a reference item from at least one image and/or derived image containing the reference item and a reference item for another reference object, Maintain/update a database of the reference objects in multiple images to create a simulation model of at least three dimensions based upon the reference objects, Generate a mug shot folder containing at least two mug shot images in response to a list of possible matched persons for an object schematic, Update a database of images and personal data to further include the object schematic, Alter a security process to create an altered security process configured to support access of object schematics, and/or Generate at least one derived image of a specific focal length from at least one image with a focal length spread to find at least one of the reference items and/or the items of interest, such as human faces and/or human bodies.

The generated reference objects, the 3-D simulations, the mug shot folders, the updated databases, the altered security processes, the derived images with their found reference items and/or items of interest, are all products of various disclosed processes.

DETAILED DESCRIPTION OF DRAWINGS

This disclosure relates to five sets of embodiments. The first embodiments generate and/or manage reference objects in images. The apparatus of the first embodiments will be referred to as the first processors 100. Each reference object includes a reference item and at least one real world measurement of the reference item. The reference items may be embedded in one or more images. The real world measurements may be embedded in the image and/or in a separate memory. Some of these embodiments may search images, or motion image sequences, for reference items such as traffic signals, traffic signs and/or license plates. These searches may include imaging operations such as zoom, pan, change of focal length, noise removal, correlation across multiple images, fractal and/or wavelet analyses.

The second embodiments use reference objects to support 3-D simulations of landscapes, urban settings, architectural models, land management presentations, disaster analysis and/or interactive games. The apparatus of the second embodiments will be referred to as the second processors 120.

The third embodiments may use the reference objects and/or the previously presented object schematics of automated facial/body recognition. The object schematics associate real world measurements with features of a human face and/or body. These object schematics may account for the distance between the eyes, height of one or both ears and so on. The automated facial/body recognition may be used to construct mug shot folders for law enforcement. Pre-existing databases may be used to identify people and support communication of the object schematics into and out of these databases. The pre-existing database of images and personal information may be upgraded to use and/or include the reference objects and/or the object schematics. The apparatus of the third embodiments will be referred to as the third processors 140.

The fourth embodiments, referred to herein as the fourth processors 180, access images 20 with a focal length spread 23 to generate one or more derived images 21 of the reference items and items of interest such as a human face and/or a human body that may then be used to generate part or all of an object schematic.

The fifth embodiments may be configured to support various combinations of two or more of the preceding embodiments, referred to herein as implementation vehicles 500.

Figure 1:
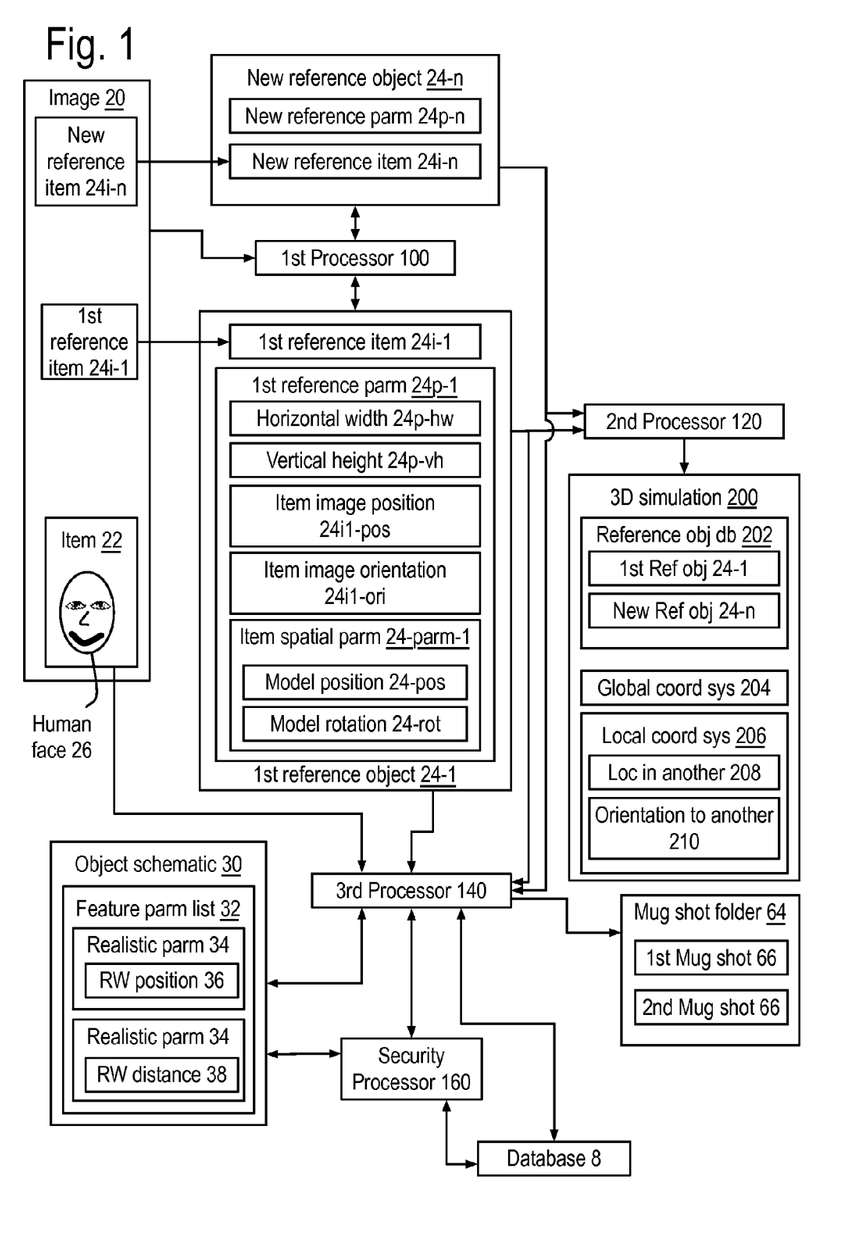
FIG. 1 shows a simplified block diagram example of the first three apparatus embodiments as a first processor, a second processor and a third processor. The first processor may generate and/or manage reference objects in images. The second processor may use reference objects to create 3-D simulations. The third processor may use reference objects and/or object schematics as in automated facial/body recognition. The third processor may be used to generate a mug shot folder of at least two mug shots based upon an object schematic. The third processor may also use a pre-existing database of images and personal data to support communication of object schematics to and from the database, possibly by altering a security processor. The third processor may upgrade the database to include object schematics.

FIG. 1 shows a simplified block diagram example of the first three apparatus embodiments as a first processor 100, a second processor 120 and a third processor 140.

The first processor 100 implements one or more of the first embodiments that generate and/or manage reference objects 24 in images 20, in this example, a first reference object 24-1 and a new reference object 24-n.

The second processor 120 implements one or more of the second embodiments that use the reference objects 24, shown here as 24-1 and 24-n, to support 3-D simulations 200.

The third processor 140 implements one or more of the third embodiments that may use the reference objects 24, 24-1, 24-n and/or the previously presented object schematic 30. These object schematics 30 may include realistic parameters 34 that account for the distance 38 between the eyes, the position 36 of a nose in a human face 26.

The third processor 140 may use reference objects 20 and/or object schematics 30 as in automated facial/body recognition, possibly to generate a mug shot folder 64 including at least two mug shots 66.

The third processor 140 may also use a pre-existing database 8 of images and personal data to support communication of object schematics 30 to and from the database, possibly by altering a security processor 160.

The third processor 140 may upgrade the database 8 to include object schematics 30.

For example, the first processor 120 may generate the new reference object 24-n based upon the first reference object 24-1 in the image 20. As used herein, a reference object 24 may include a reference item 24i and one or more reference parameters 24p. In FIG. 1, there are two examples of the reference objects 24.

The first reference object 24-1 may include a first reference item 24i-1 that is embedded in the image 20. The first reference object 24-1 also includes one or more reference parameters 24p, in this example, 24p-1, which represent real world measurements such as distance, angles, and/or vectors, as well as item image position 24i-pos and item image orientation 24-ori.

For instance, suppose the first reference object 24-1 is an automobile license plate, with a horizontal width 24p-hw and a vertical height 24p-vh included in its reference parameters 24p-1. For the moment, assume that a license plate is essentially a rectangle and that any rounding where its edges meet is overlooked to simplify this discussion. One skilled in the art will recognize that after this level of analysis is done, it may be useful to consider this further level of detail, but the basic elements of this disclosure are reflected in this simplification.

The first reference item 24i-1 may be embedded in the image 20 at an item image position 24i-pos and with an item image orientation 24i-ori, which may include a three dimensional orientation with the appropriate scaling of the first reference item 24i-1.

The first reference item 24i-1 may further located with a three dimensional first item spatial parameters 24i-parm-1 including its model position 24-pos oriented at a model rotation 24-rot, both with respect to a chosen frame of reference in three dimensions.

In some embodiments, the model position 24-pos may be one or more vectors, possibly locating two or more of the end points of the license plate in the simplified model. By including in the model position 24-pos, all four of the end points of the license plate, the may be little or no need for the model rotation 24-rot.

In other embodiments, the model position 24-pos may be a single vector, for example, indicating the three dimensional location of the midpoint of the license plate. In such embodiments, the model rotation 24-rot may be a vector or matrix indicating the rotation of the license plate from the chosen reference frame in three dimensions.

The new reference object 24-n may include a new reference item 24i-n and may be associated with new reference parameter(s) 24p-n.

The first processor 100 may operate by searching the image 20 to find the new reference item 24i-n. By way of example, suppose the image 20 includes two or more parked automobiles with visible license plates. The first processor 100 may identify the new reference item 24i-n as another automobile license. The new reference parameters 24p-n may be generated by the first processor 100 as follows:

The first processor 100 may assign the horizontal width 24p-hw and the vertical height 24p-vh to be included in the new reference parameters 24p-n.

The first processor 100 may determine the new item image position 24in-pos and the new item image orientation 24in-ori.

This information about the new item image position 24in-pos and the new item image orientation 24in-ori can then be used with the first reference parameters 24p-1 to generate the new item spatial parameters 24-parm-n similar to the first item spatial parameters 24-parm-1.

Three dimensional (3D) simulations 200 may include a reference object database 202 which may include representations and/or links to references object 24. In this example the second processor 120 may use the first reference object 24-1 and the new reference object 24-n to create the representations and/or links to them in the reference object database 202.

The 3D simulation 200 may include a global coordinate system 204. The 3D simulation 200 may also include a global coordinate system 204. The 3D simulation 200 may also include one or more local coordinate systems 206. Consider some examples of local coordinate systems:

One local coordinate system 206 may be considered the first, possibly the global coordinate system 204 as the origin and axes system of the GPS navigational system.

One local coordinate system 206 may be considered the first, possibly the global coordinate system 204 defined in terms of a location 208 and an orientation to the GPS origin and axes.

As such its location may include a GPS coordinate reading, for instance, of the origin of the global coordinate system 204 on the face of the earth, which may be considered as a two or three-dimensional vector in different situations.

The orientation 210 may refer to the orientation of the three axes of the global coordinate system 204 with respect to the axes of the GPS navigational system. The orientation may be considered a vector transformation between the coordinates of the global coordinate system 204 and the GPS navigational system.

Any other local coordinate system 206 may be referenced to a location in another coordinate system, which may be the global coordinate system 204.

As such its location may include a GPS coordinate reading, for instance, of the origin of the global coordinate system 204 on the face of the earth, which may be considered as a two or three-dimensional vector in different situations.

The orientation 210 may refer to the orientation of the three axes of the global coordinate system 204 with respect to the axes of the GPS navigational system. The orientation may be considered a vector transformation between the coordinates of the global coordinate system 204 and the GPS navigational system.

FIGS. 2A to 2C show some examples of the first processor 100 generating a new reference object 24-*n* in an image 20 from a first reference object image 24*i*-1.

FIG. 2A shows the image 20 including a building, windows, door and clock face as well as a truck with the first reference object image 24*i*-1.

The processor 100 may identify the clock face as a new reference object image 24*i*-*n* based upon the first reference object image 24*i*-1 as shown in the simplified version of the image 20 shown in FIG. 2B.

The processor 100 may identify the building as the second reference object image 24*i*-2, windows as the third and fourth reference object images 24*i*-3 and 24*i*-4, as well as the door as the fifth reference object image 24*i*-5 based upon the first reference object image 24*i*-1 as shown in the simplified version of the image 20 shown in FIG. 2C.

In 2006, a graduate student named Ren Nga at Stanford University submitted his PhD thesis entitled "Digital Light Field Photography" and initiated a new era in digital photography.

A company has been formed called Lytro, Inc. in Mountain View, Calif. to develop these new cameras.

This patent application is not concerned about the manner of making what will be called images 20 with a focal length spread 23, but with their use to generate derived images 21 of fixed focal length 23.

This application discloses and claims the extension the human facial/body recognition technology of the Applicant's previous disclosures to access the derived images 21 with their fixed focal lengths 23 to at least partly create the object schematics 30.

FIG. 3 shows an example of identifying the new reference object image 24*i*-*n* and an item 26, which is a face of an unknown person in a second image 20-2 with a focal length spread 23 that may include a focal length range from fa to fb. Together, an image set 25 including the image 20 and one or more derived images 21 of fixed focal length 23, form authenticated artifacts that may be used in law enforcement and other public safety settings to identify previously unknown persons who may be at risk, lost and/or involved with a crime.

In this example, there are two derived images 21.

The first derived image 21-1 has a focal length 23 of fa and includes the new reference image 24*i*-*n*. The new reference item 24*i*-*n* has a first realistic parameter 24P1 and a second realistic parameter 24P2. The first realistic parameter 24P1 may estimate the position of the reference item on a wall. The second realistic parameter 24P2 may estimate the width of the new reference item 24*i*-*n*.

The second derived image 21-2 has a focal length 23 of fb and includes the item 22, which in this example, is the face 26 of an unknown person 60.

FIG. 4 shows an example of a camera generating the image with a focal length spread 23 accessed by the fourth processor to generate one or more derived images of fixed focal length f used create the object schematic from the item 22 of interest and the reference image 24*i*.

A fourth processor 180 may accesses the image 20 to generate a derived image 21 of a fixed focal length f to the reference item 24*i* and for the item 22 of interest, which may be at the same focal lengths as shown in FIG. 4 or separate focal lengths as shown in FIG. 3.

The result of such a process includes not only the determination of reference objects 24 and possibly identifying an item 26, but also in the generation of the derived images 21 using known authentic image processing steps, in this situation, setting the focal length f within the focal length spread 23.

The fourth processor 180 may generate a scaled item 26 that is analyzed to create and/or alter the object schematic 30.

The object schematic 30 may be the second object schematic of an unknown person 60. The object schematic of the unknown person may be used by the third processor 140, possibly along with an object cell list 50 to select a list of possible matched persons 62 used to generate the mug shot folder 64. The database may include the object cell list.

The third processor 140 may be configured to perform one or more of the following:

Use the object schematic 30 to maintain-update a list 50 of object cells 52 containing object schematics.

And/or search the object cell list 50 for matches to a second object schematic of a person 60 to create a list of possible matched persons 62.

While a single processor 180 might perform all the operations, derive the derived images 21, create the object schematics 30, use them to maintain/update the object cell list 50 and create the list of possible matched persons 62, it may often be the case that separate processors 180 and 140 may be used. In some situations, the fourth processor 100 may be implemented as means 108 for deriving one or more of the derived image 21 of a fixed focal length f from the image 20 implement the focal length spread 23, means 110 for scaling the item 22 by the reference object 24 to create a scaled item 26 and/or means 120 for object-analyzing the scaled item to create the object schematic 30. These means may be made and/or operated separately from each other.

The object schematic 30 is a product of the object-analysis 120 of the scaled item 26 generated from the derived image 21.

Similarly, the third processor 140 may include means 142 for selecting one of the object cells 52 from the object cell list 50 having a parameter match with at least one of the extracted features in both the second object schematic 30 and the object cell to create a matched object cell 56 and/or means 146 for assembling the matched object cells to create the list 62 of the possible matched persons that may be used to generate the mug shot folder 64.

Figure 5:
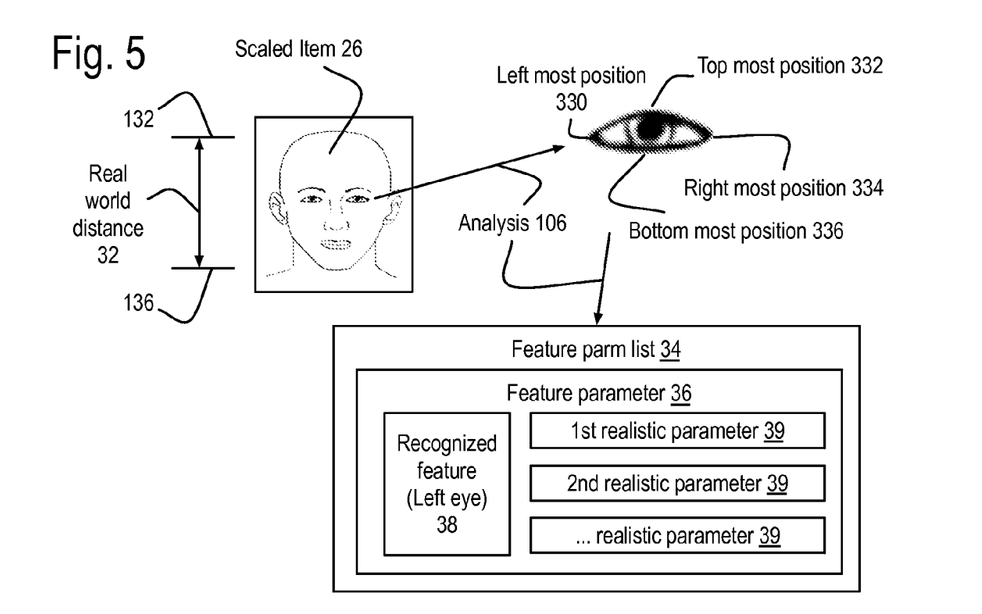
FIG. 5 shows some of an example of some possible steps involved in object-analyzing the example scaled item of FIG. 4.

FIG. 5 shows some of an example of some possible steps involved in object-analyzing 106 the example scaled item 26 of FIG. 4, where the real world distance 32 may approximate the distance between a top most position 332 and a bottom most position 336 of the scaled item. Object-analyzing may also extract a feature to create an extracted feature parameter 36, possibly identified 38 as the left eye, possibly with two or more feature parameters 39 such as a left most position 330, the top most position 332, a right most position 334 and the bottom most position 336.

These positions 130, 132, 134, and 136 may be calculated from an origin located at a midpoint position which may be at the intersection of the central tall axis and a central wide axis of the scaled item 26. These extracted parameters may also include the height of the human face in the tall axis and the width of them in the wide axis.

Figure 6:
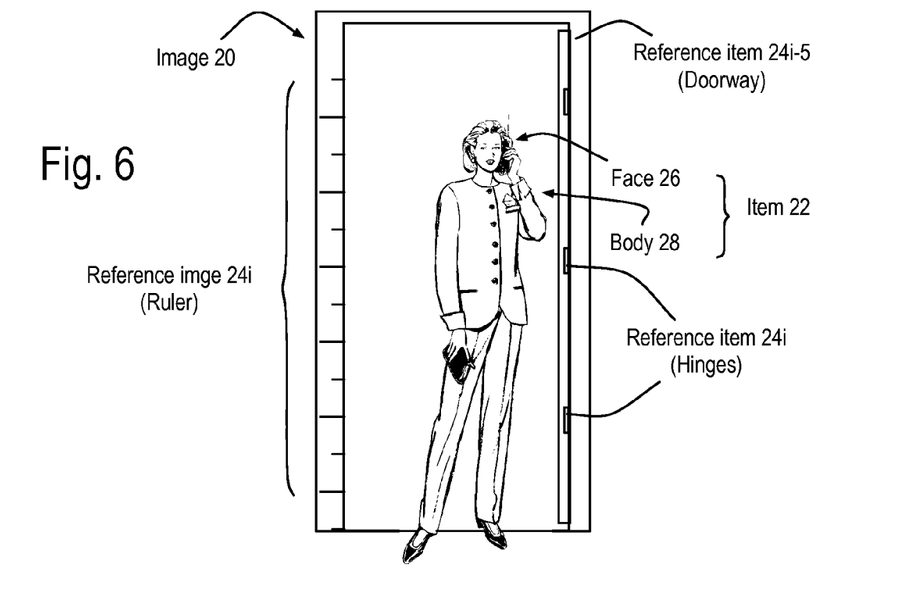
FIG. 6 shows a second example image including more than one reference object and the item includes both a human face and a human body.

FIG. 6 shows a second example image 20 including more than one reference object 24 and the item 22 includes both a human face 26 and a human body 28. The reference images 24i may include a doorway 241-5, hinges and a ruler painted on the doorway, all of which may have known sizes and possibly known positions. In other embodiments, the item 22 may be an animal or other item besides the human body and/or human face.

Figure 7A:
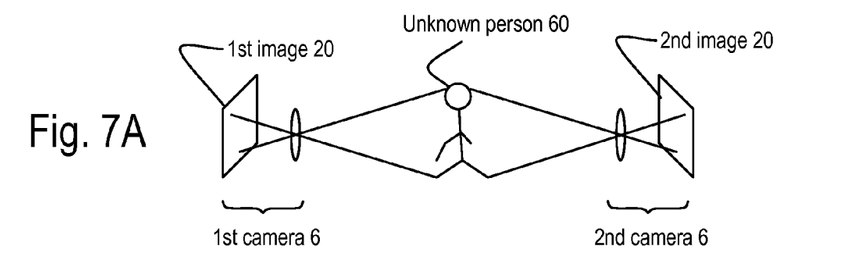
FIGS. 7A and 7B show some details of the use of multiple images that may provide a scaled item and/or be used to generate realistic parameters for a reference object from reference items in three dimensions.
Figure 7B:
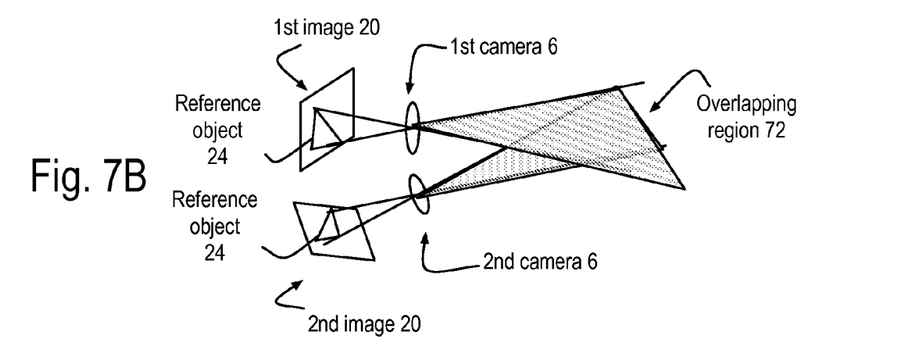

FIGS. 7A and 7B show some details of the use of multiple images 20, that may provide a scaled item 26 and/or be used to generate realistic parameters 24p for a reference object 24 from a reference item 24i in images 20 through an analysis in three dimensions. Note that more than two images 20 may be used and various correlation methods of either a statistical or method of least squares approach may be employed to improve the real world accuracy of the object schematic 30 and/or reference parameters 24p being generated.

FIG. 7A shows a simplified schematic of the use of two images 20 of the person 60 that may be taken by different cameras 6 that may be used to provide scaled item 26 and/or the object schematic 30 in three dimensions. Note that in some embodiments the person may be turned to provide profile views as in mug shots.

FIG. 7B shows a simplified schematic representation of the two cameras of FIG. 7A configured to have an overlapping region 72 that forms the reference objects 24 in the images 20. The distances may be generated from the pixel locations within these reference objects of the two images. Items 22 located in these reference objects can be scaled based upon their pixel positions through an inverse projection to the ones the cameras 6 implement.

Figure 8:
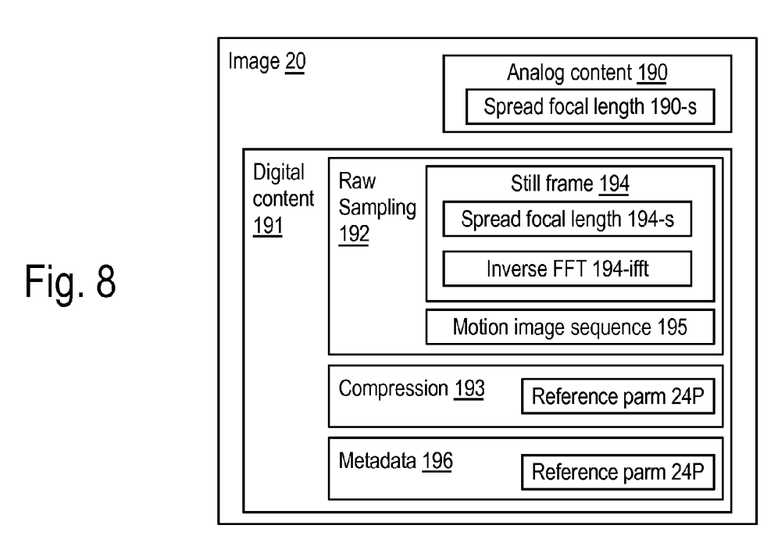
FIG. 8 shows some details of various images that may be used with the embodiments of the apparatus.

FIG. 8 shows some details of various images 20 that may be used with the embodiments of the apparatus 10. The image may include analog content 390, such as a home movie or video tape which may include spread focal length 390-s content. The image 20 may include digital content 391 that may further include at least one raw sampling 392 and/or a compression 393 of the raw sampling. The raw sampling may further include at least one still frame 394 and/or at least one motion image sequence 395. The still frame 394 may include the inverse Fast Fourier Transform (FFT) 394-ifft data and/or another form of the spread focal length 394-s. A compression 393 and/or the metadata 396 of the digital content 391 may include one or more of the reference parameters 24P.

Figure 9A:
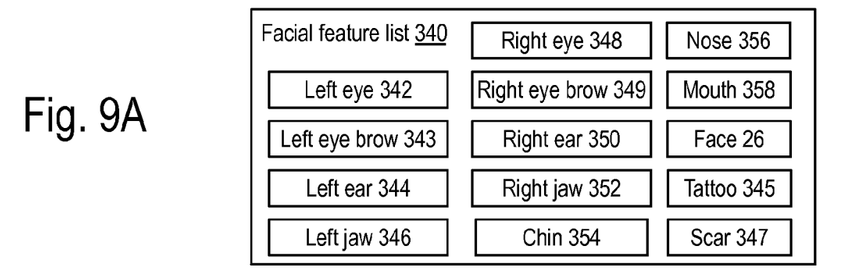
FIG. 9A shows an example of a facial feature list that may be used to identify the extracted feature found in the extracted feature parameter.

FIG. 9A shows an example of a facial feature list 340 that may be used to identify the extracted feature 38 found in the extracted feature parameter 36. The facial feature list may include a left eye 342, a left ear 344, a left jaw 346, a right eye 348, a right ear 350, a right jaw 352, a chin 354, a nose 356, a mouth 358, a tattoo 345, a scar 347 and also the face 26. Note that the face may be used to extracted real world distances 32 such as its height as shown in FIG. 5.

Figure 9B:
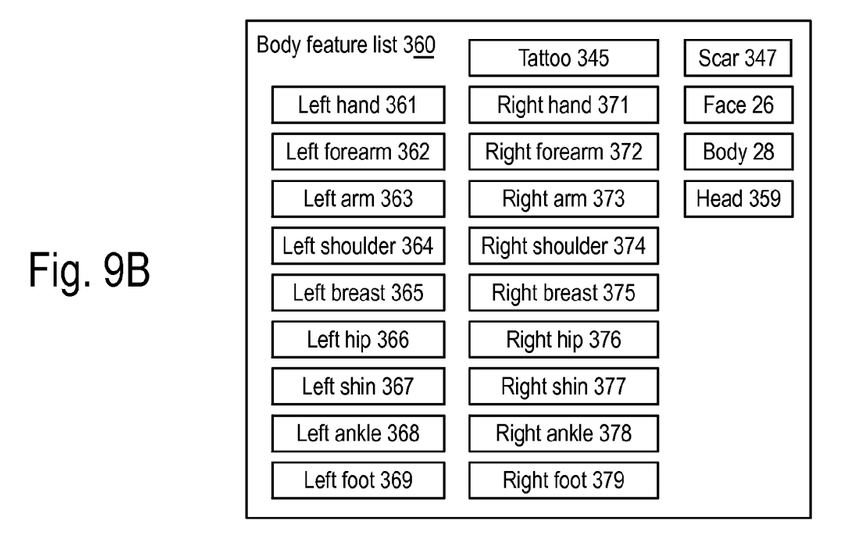
FIG. 9B shows an example of a body feature list.

FIG. 9B shows an example of a body feature list 360 that may include a left hand 361, a left forearm 362, a left arm 363, a left shoulder 364, a left breast 365, a left hip 366, a left shin 367, a left ankle 368, a left foot 369, a right hand 371, a right forearm 372, a right arm 373, a right shoulder 374, a right breast 375, a right hip 376, a right shin 377, a right ankle 378, a right foot 379, and the body 28.

Figure 9C:
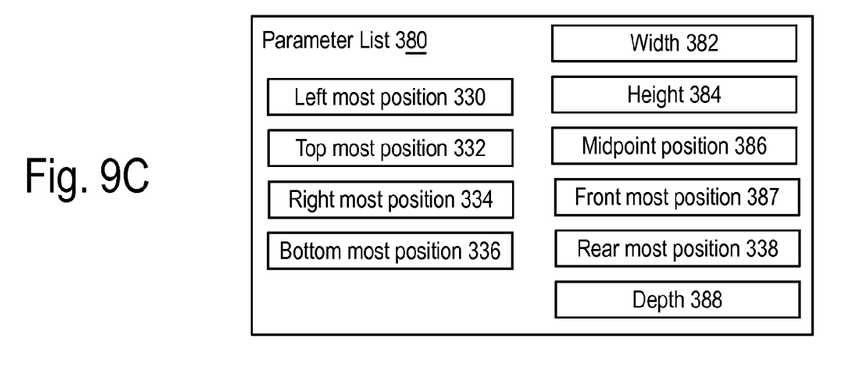
FIG. 9C shows and example of the parameter list may include the position shown in FIG. 5 as well as other positions and distances in two and three dimensions. Some of the parameters may be derived from other parameters.

FIG. 9C shows and example of the parameter list 380 may include the left most position 330 as shown in FIG. 5, the top most position 332, the right most position 334 and the bottom most position 336, as well as a width 382, a height 384, a midpoint position 386, and when dealing with object schematics 30 in three dimensions, a front most position 387, a read most position 388 and a depth 389.

By way of example, some of the parameters may be derived from some of the other parameters. The width 382 may be derived as the distance between the left most position 330 and the right most position 334. The height 384 may be derived as the distance between the top most position 332 and the bottom most position 336.

For object schematics 30 in two dimensions, the midpoint position 386 may be derived as the average of the left most position 330, the top most position 332, the right most position 334 and the bottom most position 336. In three dimensions, the midpoint position may be derived as the average of the left most position, the top most position, the right most position, the bottom most position, as well as the front most position 387 and the rear most position 338.

The depth 339 may be derived as a distance between the front most position 337 and the rear most position 338.

Figure 10:
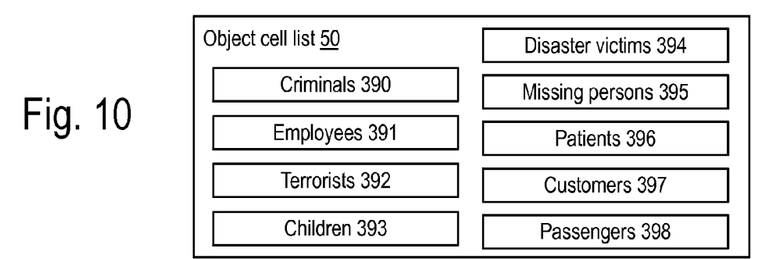
FIG. 10 shows the object cell list containing object cells for at least one of criminals, employees, terrorists, school children, disaster victims, and/or missing persons.

FIG. 10 shows the object cell list 50 containing object cells 52 for at least one of criminals 390, employees 391, terrorists 392, school children 393, disaster victims 394, missing persons 395, patients 396 of a medical facility and/or customers 397 in a retail environment.

Embodiments based upon the generation and use of the object schematic 30 may be used in one or more of the following situations:
- to identify safe or unsafe people attempting to gain entry to sensitive locations such as attempting to board an airplane, enter a government building, enter a secured work facility.
- to check for patient 396 identity in hospitals to prevent dispensing incorrect prescriptions to the wrong patient.
- at amusement parks, cruise ships, etc. to identify the customer 397 and match it with vacation photos of that person for the purpose of selling that person or his or her family photos of them at the amusement park, ship, etc.
- to speed registered passengers 398 through airport security as proof of identification.
- as proof of identity when cashing checks at banks or at stores or other locations.
- as proof of identity at ATM machines when performing banking transactions.
- as proof of identity when doing internet transactions by using a web based internet camera and reference objects 24 visible in the camera's line of sight.
- to admit patrons 397 and/or 398 to any paid event (sporting event, airplanes, trains, etc.) by comparing any know photo of the person (such as photo taken by a web camera when the tickets were purchased) to the photo of the person attempting to gain entry to the paid event.

as identification for people attempting stock trades or other financial transactions over the internet or in person.

to authorize drivers of cars. This can be used to prevent carjacking and only allow certain people to drive a car. It can also be used to prevent drunk driving such that if the car recognizes the driver as a person requiring a breath sample before they can drive while other people who do not have a drunk driving record won't be asked to present a breath sample.

And to identify school children 393 in school or to track missing children 395 in public places.

Figure 11:
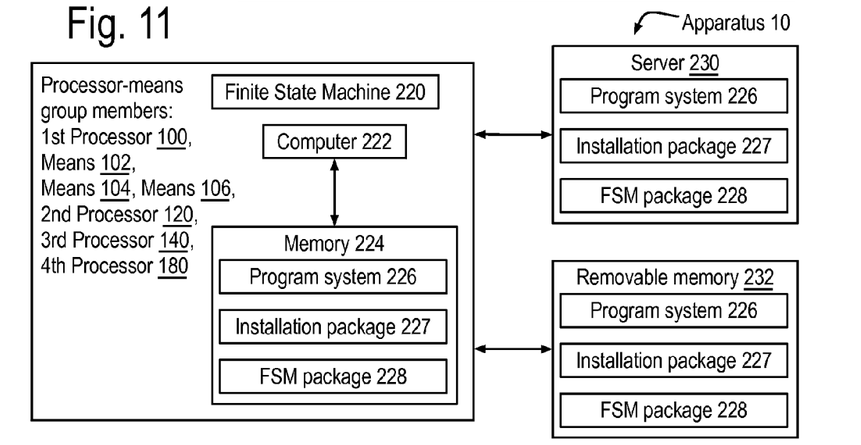
FIG. 11 shows some details of a number of embodiments of the apparatus.

FIG. 11 shows a number of embodiments of the apparatus 10, which may include at least one member of a processor-means group may comprise at least one instance of a finite state machine 220, a computer 222, and/or a memory 224 configured to be accessed by the computer. The memory 224 may include a program system and/or an installation package configured to instruct the computer to install the program system and/or a Finite State Machine (FSM) package 228 for configuring the FSM. The processor-means group may consist of the members of the first processor 100 of FIG. 1, the means 100 for scaling, the means 120 for object-analyzing, the second processor 140, the third processor 160, the means 142 for selecting, and the means 146 for assembling.

The apparatus 10 may also include a server 230 configured to deliver to at least one of the processor-means group members the program system 226 and/or the installation package 227 and/or the FSM package 228.

The apparatus 10 may also include a removable memory 232 containing the program system 226 and/or the installation package 227 and/or the FSM package 228.

The installation package 227 may include source code that may be compiled and/or translated for use with the computer 222.

As used herein a processor 100, 200 and/or 300 includes at least one controller, where each controller receives at least one input maintains/updates at least one state and generates at least one output based at least one value of at least one the inputs and/or at least one of the states. A controller may implement a finite state machine 220 and/or a computer 222. A finite state machine may further be implemented by any combination of at least one instance of a programmable logic device, such as a Field Programmable Gate Array (FPGA) or a programmable macro-cell device. A computer as used herein may include at least one data processor and at least one instruction processor, where each of the data processors is instructed by at least one instruction processor, and at least one of the instruction processors is instructed by a program system 226 including at least one program step residing in a computer readable memory 224 configured for accessible coupling to the computer. In certain situations the computer and the computer readable memory may reside in a single package, whereas in other situations they may reside in separate packages.

Other embodiments of the invention include program systems for use in one or more of these three processors 100, 200, and 300 that provide the operations of these embodiments, and/or installation packages to alter a previously existing program system 226 and/or FPGA configuration 228 to provide these operations. The installation packages 227 and/or program systems are often referred to as software. The installation packages and/or the program systems may reside on the removable memory 232, on the server 230 configured to communicate with a client configuring one or more of these processors, in the client, and/or in the processor. The installation package may or may not include the source code generating the program system and/or altering the program system.

The installation package 227 and/or the program system 226 may be made available as a result of a login process, where the login process may be available only to subscribers of service provided by a service provider, where the service provider receives revenue from a user of the processor 100, 200 and/or 300. The revenue is a product of the process of the user paying for the subscription and/or the user paying for the login process to access downloading the installation package and/or the program system. Alternatively, the user may pay for at least one instance of at least one of the processors creating a second revenue for a product supplier. The second revenue is a product of the user paying for the processor(s) from the product supplier.

Figure 12:
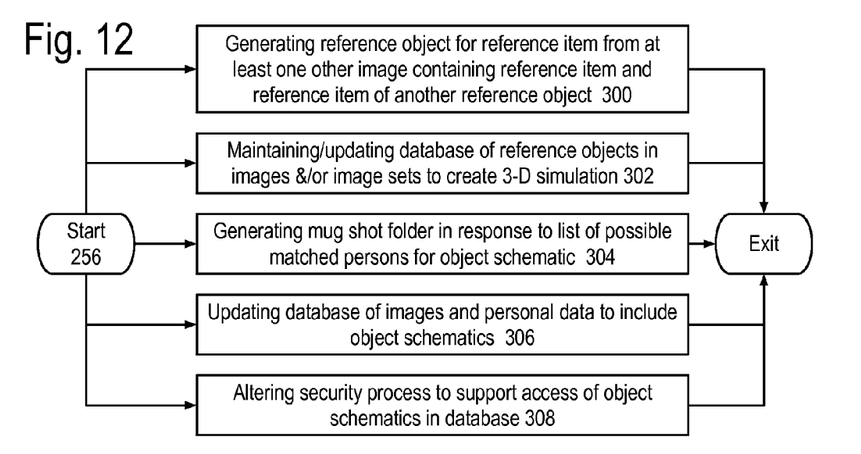
FIG. 12 shows a flowchart of variously newly disclosed methods of operation, use, updating, altering and generation.

FIG. 12 shows examples of at least one of the processors 100, 120 and/or 140 of FIGS. 1 and/or 4 may be configured to perform one or more of the following, possibly as program steps included in the program system 226:

Program step 300 supports generating the reference object 24 (shown in FIG. 1 as the new reference object 24-*n*) for a reference item 24*i* (in FIG. 1 as the new reference item 24*i-n*) from an image containing the reference item 24*i-n* and a reference item 24*i*-1 for another, first reference object 24-1.

Program step 302 supports maintaining and/or updating a database 202 of the reference objects 24-1 and 24-*n* in multiple images 20 and/or image sets 23 to create a simulation model 200 of at least three dimensions based upon the reference objects.

Program step 304 supports generating a mug shot folder 64 containing at least two mug shot images 66 in response to a list of possible matched persons 62 (shown in FIG. 4) for an object schematic 30

Program step 306 supports updating a database 8 of images 20 and personal data 56 to further include the object schematic 30.

Program step 308 supports altering a security process herein shown as a security processor 160 in FIG. 1, to create an altered security process configured to support access of object schematics 30 in the database 8.

Figure 13:
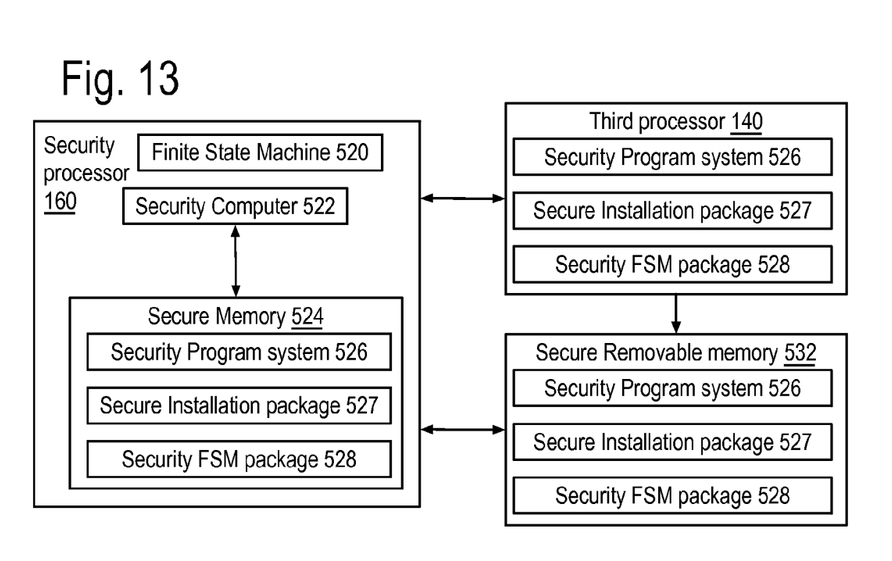
FIG. 13 shows some details of the security processor possibly implementing the altered security process as a security program system. The security processor may be configured and/or altered by the third processor. In some implementations the third processor may generate and/or alter a secure removable memory. The security processor may be configured through interacting with the secure removable memory.

Altering the security process of program step 308 may be implemented as shown in FIG. 13. The security processor 160 may include one or more instances of a finite state machine (FSM) 520 and/or a security computer 522 that may access a secure memory 524. The secure memory 524 may include a security program system 526, possibly a secure installation package 527 and/or a security FSM package 528.

The third processor 140 may generate the security program system 526, and/or the secure installation package 527 and/or the security FSM package 528.

The security program system 526 may implement communication with the database 8 in terms of object schematics 30 that may be included in the database.

The secure installation package 527 may alter the security program system 526 to support such communication.

The security FSM package 528 may be used to configure the finite state machine 520 to support the altered security process. For example, the finite state machine 520 may be altered to implement a database access protocol parser, possibly similar to SQL (Structured Query Language), Prolog or Perl, extended to support the semantic and syntactical primitive regarding real world features 36 and their realistic parameters 39 as discussed regarding FIGS. 5, 6 and 9A to 9C.

The third processor 140 may directly communicate the security program system 526, the secure installation package 527 and/or the security FSM package 528 in some implementations.

In other implementations, it may be preferred that a secure removable memory 532 be configured to deliver the security program system 526, the secure installation package 527 and/or the security FSM package 528 to the security processor 160.

In some implementations, the security processor 160 may also implement some or all of the database 8 operations and storage. Whereas in other implementations, these may be separate apparatus.

The parent patent application disclosed facial/body recognition. These flowcharts present modified methods accessing the image 20 with a focal length spread 23 as shown in FIG. 3 to generate one or more derived images 21 of fixed focal length f used create the object schematic 30 from the item 22 of interest and the reference image 24i.

Figure 14:
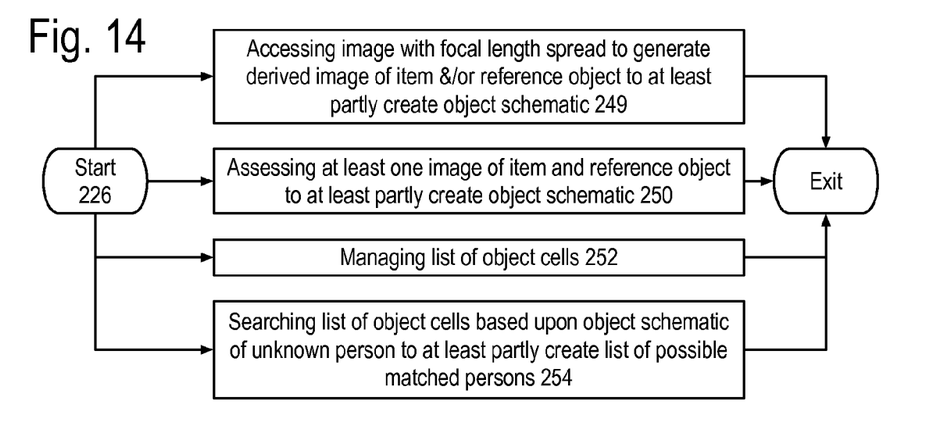
FIGS. 14 to 17 show some flowcharts of various previously presented, though somewhat modified, methods of at least partly engaging with the images, and/or maintaining-updating the list of object cells, and/or at least partly generating the list of possible matched persons as first shown in FIG. 1.

FIG. 14 shows the program system 226 may the program step 249 supports accessing the image 20 with a focal length spread 23 as shown in FIG. 3 to generate one or more derived images 21 of fixed focal length f used create the object schematic from the item 22 of interest and the reference image 24i. The program system 226 may further include any combination of the following:

Program step 250 supports engaging with at least one derived image 21 of the item 22 and at least one reference object 24 to at least partly create the object schematic 30.

Program step 252 supports maintaining-updating the list 50 of the object cells 52.

And program step 254 supports searching the list of object cells based upon the second object schematic of the person 60 to at least partly create the list 62 of possible matched persons.

Figure 15:
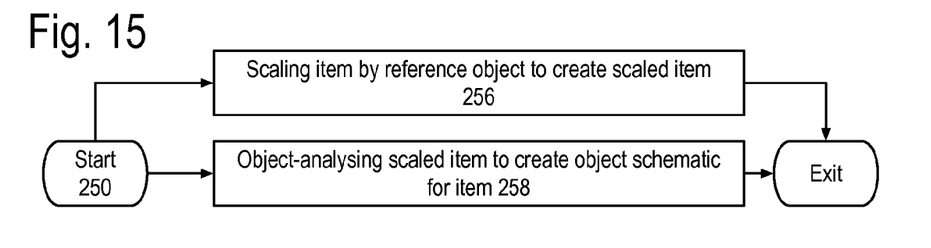

FIG. 15 shows some details of program step 250 that support engaging with the derived image 21 to at least partly create the object schematic, which may include any combination of the following program steps. Program step 256 supports scaling the item 22 by the reference object 245 to create the scaled item 26. And program step 258 supports object-analyzing the scaled item to create the object schematic 30 for the item.

Figure 16:
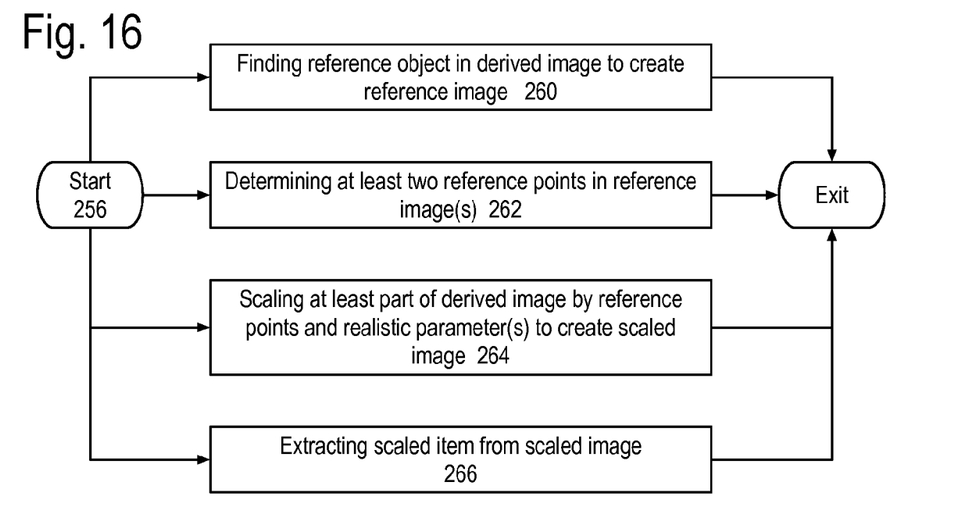

FIG. 16 shows some examples of the details of program step 256, which may include any combination of the following. Program step 260 supports finding at least one of the reference object 24 in the derived image 21 to create the reference image 24i. Program step 262 supports determining at least two reference points in the reference image 24i, and a real distance between the reference points. Program step 264 supports scaling at least part of the image by the reference points and the real distance to create the scaled image 26. And program step 266 supports extracting the scaled item from the scaled image.

Figure 17:
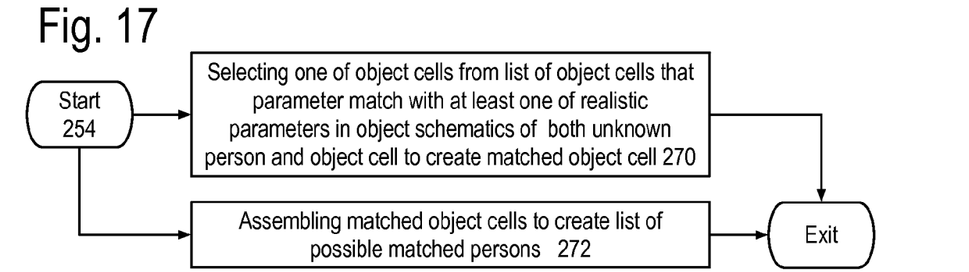

FIG. 17 shows some details of the program step 254 that support searching the list of object cells based upon the second object schematic of the person to at least partly create the list of possible matched persons by including at least one of the following. Program step 280 supports selecting one of the object cells 52 from the object cell list 50 having a parameter match with at least one of the extracted features 38 in both the object schematic 30 of the person 60 and the object cell to create the matched object cell 56. And program step 272 supports assembling the matched object cells to create the list 62 of the possible matched persons.

FIGS. 18A to 18H show examples of the apparatus of the fifth embodiment as implementation vehicles 500 configured to perform the operations of at least two of the four previously discussed embodiments shown as the first processor 100, the second processor 120, the third processor 140, and the fourth processor 180.

Figure 18A:
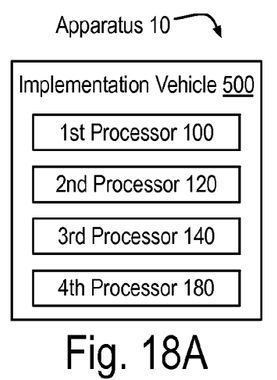
FIGS. 18A to 18D show examples of the apparatus of the fourth embodiment as implementation vehicles configured to perform the operations of at least two of the three previously discussed embodiments.
Figure 18B:
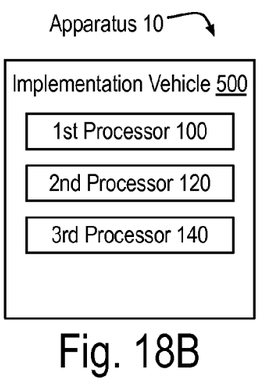
Figure 18C:
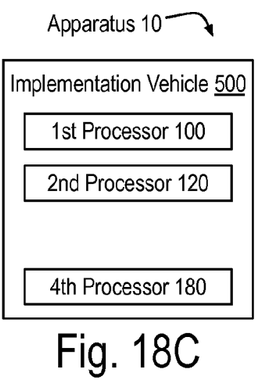
Figure 18D:
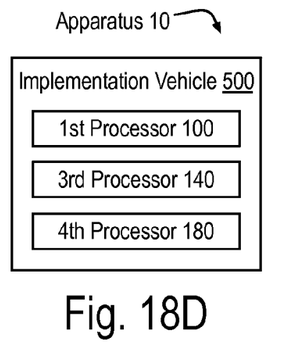
Figure 18E:
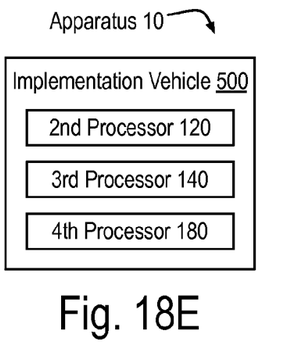

FIG. 18A shows an implementation vehicle 500 configured to implement all four processors 100, 120, 140 and 180.

FIGS. 18B to 18E show examples of the implementation vehicles 500 configured to implement combinations of three of the processors 100, 120, 140 and 180.

Figure 18F:
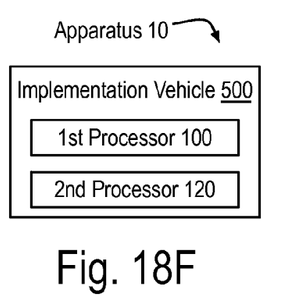
Figure 18G:
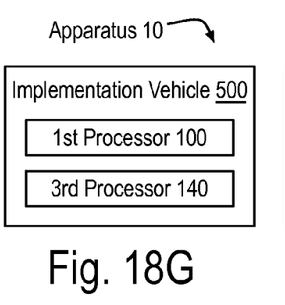
Figure 18H:
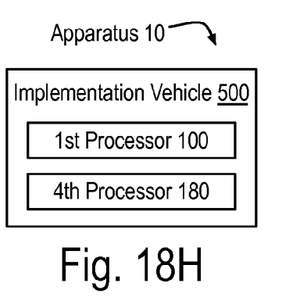

FIGS. 18F to 18H show some examples of the implementation vehicles 500 configured to implement combinations of two of the processors 100, 120, 140 and 180.

FIGS. 19A to 19E show examples of computers, reconfigurable logic devices, communication devices, cameras, cellular phones, Internet access devices variously configured as the implementation vehicle.

Figure 19A:
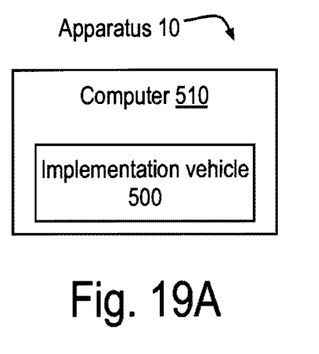
FIGS. 19A to 19E show examples of computers, reconfigurable logic devices, communication devices, cameras, cellular phones, Internet access devices variously configured as the implementation vehicle.

FIG. 19A shows the computer 510 including the implementation vehicle 500.

Figure 19B:
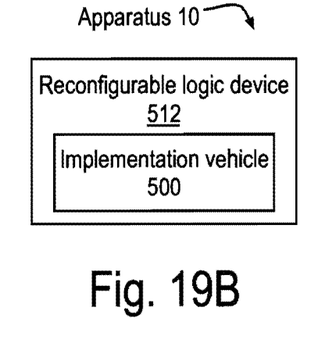

FIG. 19B shows a reconfigurable logic device 512 including the implementation vehicle 500.

Figure 19C:
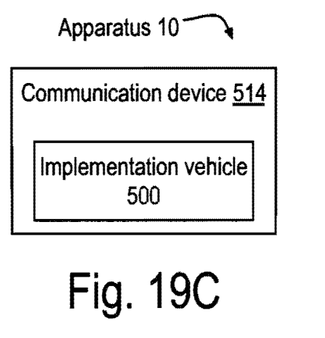

FIG. 19C shows a communication device 514 including the implementation vehicle 500.

Figure 19D:
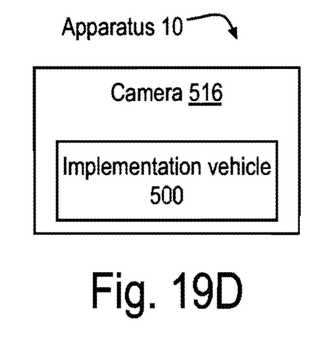

FIG. 19D shows a camera 516 including the implementation vehicle 500.

Figure 19E:
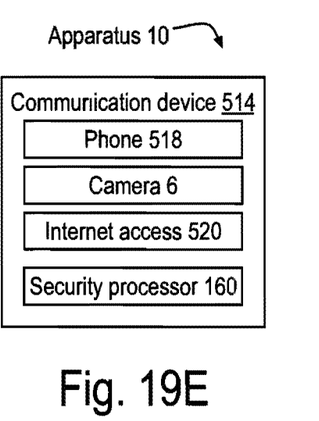

FIG. 19E shows some details of the communication device 514 of FIG. 19C including one or more of a cellular phone 518, the camera 516, an Internet access device 520 and/or the security processor 160.

The reference object 24, the mug shot folder 66, the database 8 configured to include the object schematics 30 and/or the object cells 52, the reference object database 202, the 3D simulations 200 and the security processor 160 are all products of various steps of the currently disclosed methods.

The database 8 incorporates realistic parameters 39 of position and/or distance, which serve to reduce false matches due to similarly proportioned, but differently sized, features. These real world elements serve to improve homeland security, identification of children 393 in crowds, criminals 390 and terrorists 392, as well as aiding in the identification of missing persons 395 and disaster victims 394.

The reference object database 202 supports the inexpensive compilation of relatively static components of a landscape or urban setting as reference objects 24, which may then be incorporated in a systematic fashion into 3-D simulations 200.

The mug shot folders 66 reduce questions of partiality, improving the operation of criminal justice systems by reducing procedural questions that slow down the courts.

The updated personnel databases 8 and the altered security processors 160 bring the advantages of the object schematic 30, object cells 52 and improved lists 62 of possible matched persons to mainframe personnel databases and their access across a nation and across national boundaries.

The preceding embodiments provide examples of the invention, and are not meant to constrain the scope of the following claims.

What is claimed is:

1. An apparatus, comprising: a processor configured to use an image containing a first reference item and a new reference item to create a second of a reference object based upon a first of a reference object including said first reference item and at least one of a first of a reference parameter of said first reference item, with said second of said reference object including said new reference item and at least one of a second of said reference parameter generated based upon at least one of said first of said reference parameter included in said first reference object; said processor is configured to use said first reference object and said new reference object to at least partly create a three-dimensional (3D) simulation containing a database of said reference objects;

said processor is configured to generate a mug shot folder of at least two mug shots in response to a list of possible matched persons for an object schematic based upon an item and at least one of said reference items contained in an image set and/or an image; said processor is configured to update a second database of said images and personal data to include said object schematics; said processor is configured to after said security process to create an altered security process to support secure access of said object schematics in said second database; and said processor is configured to access said image with a focal length spread to generate a derived image of a fixed focal length of said item and/or said reference object to at least partly create said object schematic; wherein said first reference item, said second reference item, and said new reference item are part of a building and/or an automobile and/or a truck and/or an authenticated artifact.

2. The apparatus of claim 1, wherein said reference parameter includes at least one of a horizontal width, a vertical height, an item image position, an item image orientation, and/or an item spatial parameter configured to model a position and/or a rotation of said reference item.

3. The apparatus of claim 1, wherein said 3D simulation further includes at least one coordinate system used by said database and at least some of its said reference objects.

4. The apparatus of claim 1, wherein said image includes a focal length spread in at least one an analog content and a digital content;

wherein said digital content includes at least one of raw sampling of said image, an inverse Fast Fourier Transform of said raw sampling, and a compression of said raw sampling, with said raw sampling supporting at least one of a still frame and a motion image sequence.

5. The apparatus of claim 1, wherein said reference object includes a shared field of view between said at least two images;

wherein said apparatus further comprises means for scaling said item by said reference object to create a scaled item further comprises means for scaling said item by a projection based upon said shared field of said view to create scaled item.

6. The apparatus of claim 1, wherein said processor includes at least one instance of a member of the group consisting of a Finite State Machine (FSM), a computer, a computer accessible memory including at least one of a program system, an installation package configured to instruct said computer to install said program system, and a FSM package configured to instruct said FSM.

7. A server configured to deliver to said processor of claim 6, at least one of said program system, said installation package, and said FSM package.

8. A removable memory, containing at least one of said program system of claim 6, said installation package, and said FSM package.

9. The apparatus of claim 6, further comprising an implementation vehicle configured to implement the processor.

10. The apparatus of claim 9, wherein said implementation vehicle is implemented in one of said computer, a reconfigurable logic device, and a communication device.

11. The apparatus of claim 10, wherein said communication device includes at least one of a phone, a camera, an Internet access device and/or said processor.

12. A method, comprising the step of operating an apparatus, further comprising the steps of: generating a new reference object for a new reference item from at least one image containing said new reference item and another of said reference items belonging to another of said reference objects, with each of said new reference object and said another of said reference object including at least two reference parameters of said reference item; maintaining/updating a database of said reference objects to create a three-dimensional (3D) simulation; generating a mug shot folder of at least two mug shots in response to a list of possible matched persons for an object schematic based upon an item and at least one of said reference items contained in an image set and/or an image; updating a second database of said images and personal data to include said object schematics; altering said security process to create an altered security process to support secure access of said object schematics in said second database; and accessing said image with a focal length spread to generate a derived image of a fixed focal length of said item and/or said reference object to at least partly create said object schematic; wherein said first reference item, said second reference item, and said new reference item are part of a building and/or an automobile and/or a truck and/or an authenticated artifact.

13. The method of claim 12, wherein said apparatus includes at least one of a computer, a reconfigurable logic device, a communication device, a phone, a camera, an internet access device and/or a security processor.

14. The method of claim 12, wherein at least one of said new reference object, said 3D simulation, said mug shot folder, said second database, said altered security process, and said derived image of said fixed focal length are produced.

* * * * *